United States Patent

[11] 3,607,447

| [72] | Inventors | Bayard C. Davis<br>425 South Grace St., Lombard, Ill. 60148;<br>Alvin Singer, 1125 Honikelder Road,<br>Glencoe, Ill. 60022 |
|---|---|---|
| [21] | Appl. No. | 29,134 |
| [22] | Filed | Apr. 16, 1970 |
| [45] | Patented | Sept. 21, 1971<br>Continuation of application Ser. No.<br>769,560, Oct. 22, 1968, now Patent No.<br>3,538,596, which is a division of application<br>Ser. No. 475,495, July 28, 1965, now<br>abandoned. |

[54] NONWELDED THERMOCOUPLE JUNCTIONS
11 Claims, 6 Drawing Figs.

| [52] | U.S. Cl. | 136/233, 136/201 |
|---|---|---|
| [51] | Int. Cl. | H01v 1/02 |
| [50] | Field of Search | 136/200, 201, 230–234 |

[56] References Cited
UNITED STATES PATENTS

| 1,660,504 | 2/1928 | Grubb | 136/233 |
|---|---|---|---|
| 2,012,112 | 8/1935 | States | 136/233 X |
| 2,698,872 | 1/1955 | Broffitt | 136/224 |
| 3,338,752 | 8/1967 | Finney | 136/233 |

*Primary Examiner*—Carl D. Quarforth
*Assistant Examiner*—Harvey E. Behrend
*Attorney*—Hume, Clement, Hume & Lee ABSTRACT: A nonwelded thermocouple assembly specifically adapted for use in a high temperature environment is disclosed. The thermocouple wires are of a refractory metal composition including at least one metal selected from the group consisting of tungsten, rhenium and molybdenum. The wires extend through a refractory metal sheath and are supported in spaced relation therewithin by a refractory insulating material. The ends of the thermocouple wires are received in apertures in an end plug and the plug is swaged about the wires to effect an exclusively mechanically bonded junction. An end closure cap for the sheath completes the assembly Three embodiments and other features are disclosed.

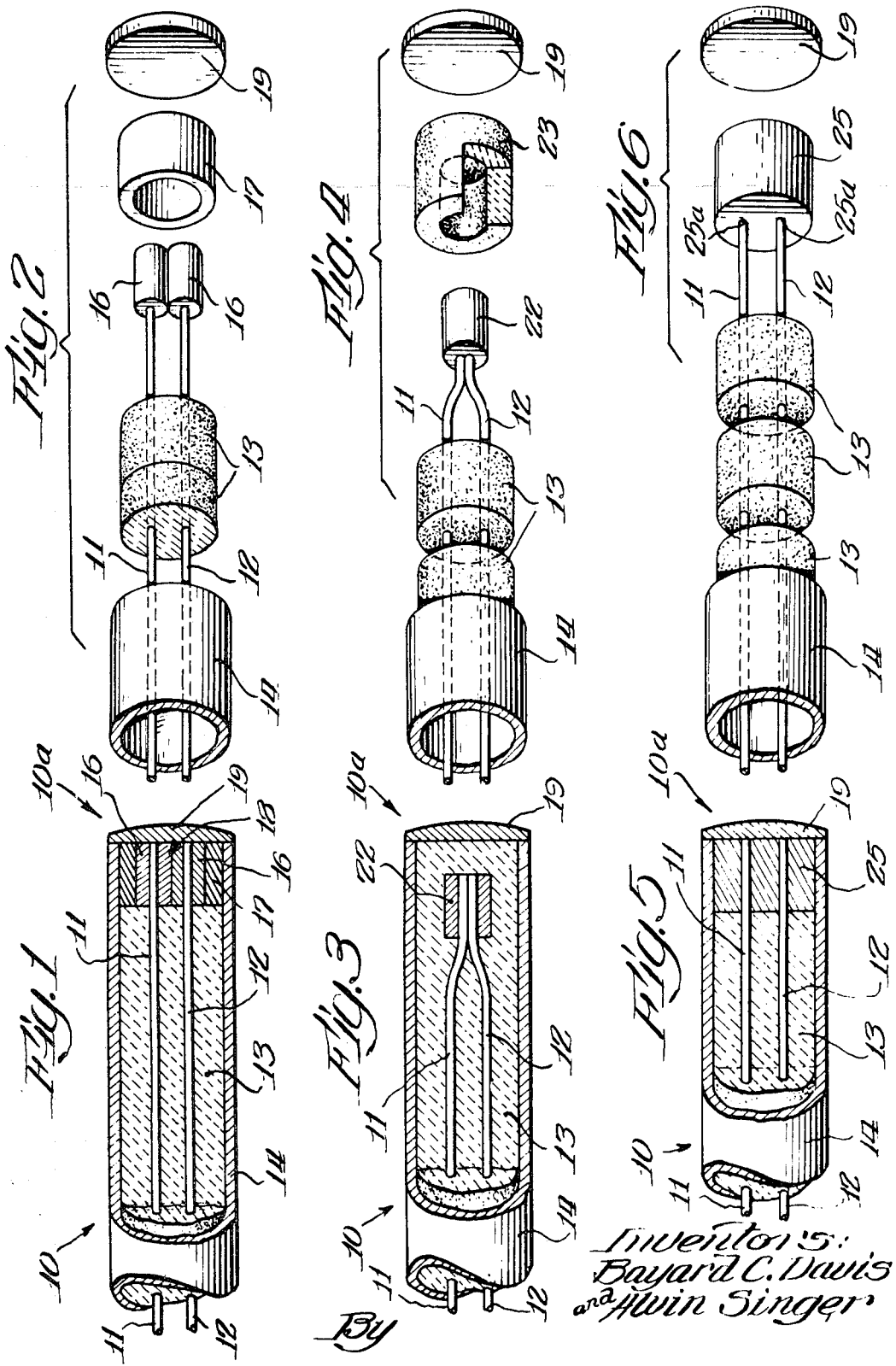

3,607,447

NONWELDED THERMOCOUPLE JUNCTIONS

CROSS-REFERENCE TO RELATED APPLICATION

The present application is a continuation of copending application Ser. No. 769,560, now U.S. Pat. No. 3,538,596, filed Oct. 22, 1968, which is in turn a division of copending application Ser. No. 475,495, filed July 28, 1965, now abandoned.

INTRODUCTION

The present invention is directed to thermocouple junctions and more particularly to nonwelded, plug type junctions for the thermocouple elements of a complete thermocouple assembly.

SUMMARY OF THE INVENTION

It is an object of the invention to provide an improved form of nonwelded junction for the thermocouple elements of a metallic sheathed and insulated thermocouple assembly.

Still another object of the present invention is to provide both densely compacted and noncompacted (i.e., vitrified or high fired), grounded and ungrounded, nonwelded, plug-type junctions that are particularly suitable for use with refractory metal thermocouple wires or elements (i.e., thermoelements).

A further object of the present invention is to provide nonwelded junctions for the thermocouple elements of an assembly, which junctions are readily and inexpensively formed and do not create substantial voids in or otherwise impart structural weakness to a completed assembly.

BRIEF DESCRIPTION OF THE DRAWINGS

Other objects and advantages of the present invention will become apparent from the following description of several preferred embodiments thereof, particularly when considered in conjunction with the accompanying drawing wherein:

FIG. 1 is a fragmentary view partially in cross section which depicts one embodiment of a nonwelded thermocouple junction constructed in accordance with the present invention;

FIG. 2 in a partially exploded view of the junction depicted in FIG. 1;

FIG. 3 is a view similar to FIG. 1 but illustrating another form of nonwelded junctions;

FIG. 4 is a partially exploded view of the junction shown in FIG. 3;

FIG. 5 is a fragmentary view, partially in cross section, illustrating another embodiment of a nonwelded junction constructed in accordance with the present invention; and FIG. 6 is a partially exploded view of the junction illustrated in FIG. 5.

DESCRIPTION OF THE PREFERRED EMBODIMENTS

Referring generally to the drawing, the present invention contemplates both grounded and ungrounded, nonwelded, plug-type junctions for thermocouple assemblies, particularly metallic sheathed and insulated thermocouple assemblies employing refractory metal thermocouple elements. The supporting insulating medium of the assemblies may either be of the densely compacted type or may be a noncompacted vitrified insulating medium that is intimately surrounded and confined by the outer sheath.

In accordance with the invention, the thermocouple wires or elements (i.e. the thermoelements) are joined in electrical contact by means of a plug-type junction that may either be insulated from or maintained in electrical contact with the metallic sheath of the thermocouple assembly. In one embodiment of the invention, the thermocouple elements are electrically joined to each other and to the metallic sheath in a grounded configuration by means of a plurality of tubular housing members that are swaged about and joined in integral physical contact with the ends of the thermocouple elements.

In another embodiment of the invention, the thermocouple elements are joined in direct electrical and contact by means of a single tubular member that is in turn housed within an insert of a ceramic insulating material or the like so as to be insulated from the metallic sheath of the completed assembly. Alternatively, another form of grounded thermocouple junction is constructed with the thermocouple elements having their junction-forming ends being confined within a single plug-type element of metallic material which is joined to and maintained in electrical contact with the interior surface of the confining sheath of the completed assembly.

In both the grounded and ungrounded, nonwelded junctions contemplated by the present invention for use particularly with refractory metal thermocouple elements, the difficulties typically caused by embrittlement of such elements and stemming from welding of the junctions (i.e., discontinuities at the junction when a completed assembly is put in use in a high-temperature environment) are avoided. In addition, severe bending of the elements is unnecessary to create the desired nonwelded junctions, and a completed assembly need not include void spaces which can also be a source of substantial difficulty.

FIGS. 1 and 2 depict a grounded form of nonwelded thermocouple junction. As will be appreciated by those skilled in the art and as employed in the following description, the term "grounded junction" contemplates a thermocouple junction that is maintained in electrical contact with the sheath of the completed assembly. Referring to these figures, the thermocouple assembly 10, in a conventional manner, includes at least a pair of thermocouple elements or wires 11 and 12 that are confined within and maintained in spaced apart, electrically insulated relationship by a filler 13 of a suitable temperature resistant insulating material. The filler of insulating material that surrounds and confines the thermocouple wires 11 and 12 is in turn intimately surrounded by a metallic sheath 14 of a suitable material which is both impervious to moisture and resistant to the extremely high temperature typically encountered by such a thermocouple assembly. As generally outlined above, the filler of insulating material may either be a densely compacted ceramic insulating medium or may consist of a plurality of adjacently disposed, noncompacted vitrified (i.e., high fired) pellets.

The metallic sheathed thermocouple assembly (sometimes termed a thermocouple wire or conductor), including the thermocouple elements 11 and 12, the filler 13, and the metallic sheath 14, is constructed so that only a portion of the assembly constitutes the thermocouple junction (i.e., the "hot" junction for the completed assembly). That is, only the end portions of the thermocouple wires 11 and 12 are joined together adjacent the terminal end 10a of the assembly 10 so as to form the junction.

More specifically, the ends of the thermocouple wires 11 and 12 are each confined within a small metallic tube 16 that surrounds and intimately engages the end of the respective thermocouple wire. Preferably, the small metallic tubes 16, which are formed from a metallic material that is compatible with the other components of the assembly, are swaged about and in contact with the ends of the individual thermocouple wires. The small metallic tubes 16 are in turn confined within a large outer confining tube 17 formed of similar material that is preferably swaged about both of the smaller tubes, so as to form an intimate and structurally stable junction 18.

In accordance with the invention, the aforedescribed subassembly or junction 18 (i.e., including the tubes 16 and the outer confining tube 17) is preformed prior to the fabrication of the remaining portion of the thermocouple assembly 10. Accordingly, the tube 17 when swaged about the tubular elements 16 preferably provides an exterior diameter that allows the subassembly to be fitted within the sheath 14 prior to the final fabrication operations essential to producing a thermocouple assembly.

That is, after the subassembly is completed as described above, pellets of the ceramic material which form the filler 13 are, in a conventional manner, strung on the thermocouple wires 11 and 12 from the ends thereof opposite the junction 18. This partially fabricated assembly is then fitted within the exterior sheath 14 and the entire unit is swaged into a homogeneous assembly. Depending on the type of material comprising the filler 13, the final swaging of the sheath either densely compacts the insulating material or is brought into intimate confining relationship with the vitrified pellets.

In the illustrated embodiment, the thermocouple assembly is completed by an end cap or closure element 19 that is welded or otherwise suitably joined into the terminal portion of the completed assembly subsequent to the final swaging or other fabrication step employed to yield a completed unit that is free of void spaces, particularly in the region of the junction 18. As is obvious from the foregoing description, the outer confining tube 17 is maintained in electrical contact with the inner surface of the metallic sheath adjacent the end thereof so that a grounded junction is provided.

Referring to FIGS. 3 and 4, this embodiment of a nonwelded, plug-type junction contemplates an ungrounded junction wherein the thermocouple wires 11 and 12 are swaged into structurally stable contact within a single confining element or tube 22. Preferably, the free ends of the thermocouple wires 11 and 12 are placed inside the tube 22 in essentially parallel relationship. The tube is thereafter swaged about the ends of the wires in the manner shown in FIG. 3 so as to both minimize the angle of merger and maintain the departure of the thermocouple wires from the existing parallel arrangement to the region closely adjacent the tube 22.

In this alternate embodiment of an ungrounded junction it is desirable to effect positioning of the joined wires and tube in the central axial region of the final assembly so that a maximum amount of insulation is provided between the exterior surface of the metallic tube 22 and outer confining sheath 14. In this latter regard, a suitably apertured pellet 23 of a ceramic or other suitable insulating material is positioned over and surrounds the joined wires and tube that from the junction in the manner that the other pellets are strung on the parallel segments of the wires prior to the final fabricating steps as outlined above, whereby a structurally stable and unified assembly is provided.

The embodiment of FIGS. 5 and 6 is an alternate form of grounded nonwelded junction in which individual thermoelement confining tubes (e.g., such as the tubes 16 and 25) and an external confining tube (e.g., such as the tube 17) are replaced by a single metallic plug 25 that is predrilled to accommodate the free ends of the parallely disposed thermoelectric wires 11 and 12. More specifically, the plug 25, which if formed of a metallic material compatible with the outer components of a completed assembly, is preferably predrilled with a pair of parallel apertures 25a that are proportioned to receive the free or terminal ends of the thermocouple wires 11 and 12. In this embodiment and after the wires have been placed with the apertures 25a, the plug 25 is preferably swaged about the free ends of the wires so that a strong mechanical and continuous electrical bond is achieved. The completion of the assembly (i.e., the stringing of the pellets, the fitting of the sheath over the subassembly, the final fabricating steps, and the welded closure) is carried out as previously described.

In each of the three embodiments of nonwelded junctions previously described in conjunction with FIGS. 1–6, a strong and structurally stable mechanical and electrical bond is achieved between the thermocouple wires of the assembly. Moreover, because of the nature of these junctions, the continuity of the electrical connection is insured throughout the operational life of the assembly and void spaces which can ultimately cause deterioration of the assembly are eliminated.

With reference to a specific embodiment of an assembly of the type illustrated in FIGS. 1 and 2, such a junction can readily be provided in a thermocouple assembly having an outside diameter as small as 0.40 inches and including two or more thermocouple wires formed from materials such as tungsten, rhenium, and molybdenum. In such an assembly, the diameter of the thermocouple wires is approximately 0.005 inches and the tubes 16 are accordingly selected with an inside diameter of 0.006 inches and an outside diameter of 0.011 inches. The outer confining tube 17 is proportioned with an inside diameter of 0.024 inches and an outside diameter of 0.035 inches. Upon completion of such a junction 18, pellets of a ceramic insulating material such as beryllium oxide are strung over the thermocouple wires and this subassembly is fitted within a metallic sheath formed of tantalum or molybdenum and having inside and outside diameters of 0.049 inches and 0.065 inches, respectively, prior to a final swaging operation.

For an exemplary assembly of the type depicted in FIGS. 3 and 4, the dimensions of the components and their material fabrication is preferably the same as the aforedescribed embodiment with the exception that the element 22 is formed with an outside diameter of 0.020 inches and has an inside bore of 0.011 inches in diameter to accommodate the thermocouple wires prior to fitting within the apertured region of the insulating plug 23, which is also preferably formed of beryllium oxide. In the embodiment of FIGS. 5 and 6, the apertured or bored plug 25 is preferably a solid member formed of tantalum or molybdenum, having an outside diameter of 0.035 inches so that it readily fits within the metallic sheath prior to the final fabricating operations.

It will be appreciated that the foregoing description is merely illustrative of the invention. Various modifications of the aforedescribed embodiments might be devised by those skilled in the art without departing from the invention, various features of which are set forth in the accompanying claims.

We claim:

1. A thermocouple assembly including at least a pair of dissimilar thermocouple wires, a quantity of temperature-resistant electrically insulating material that surrounds the wires so as to confine and maintain the wires in spaced-apart relation, and a metallic outer sheath intimately surrounding the insulating material so that the wires are fixedly confined therein in insulated relationship relative to the sheath, and wherein the confined insulating material terminates short of one end portion of the sheath so that a void region is defined by the one end portion into which the end portions of the thermocouple wires extend; and a nonwelded plug-type junction comprising at least a pair of small metallic wire-confining tubes and a metallic outer confining tube, one each of said small wire-confining metallic tubes being mounted about and in intimate contact with one each of said extending end portions of the thermocouple wires, said outer confining tube being intimately mounted about said wire-confining tubes to complete said junction.

2. As assembly in accordance with claim 1 wherein said metallic outer confining tube is in intimate electrical and physical contact with said end portion of said metallic outer sheath.

3. In a thermocouple assembly including at least a pair of dissimilar thermocouple wires, a quantity of temperature-resistant insulating material that surrounds the wires so as to confine and maintain the wires in spaced-apart relation, and a metallic outer sheath intimately surrounding the insulating material so that the wires are fixedly confined therein in insulated relationship relative to the sheath, and wherein the confined insulating material terminates short of one end portion of the sheath so that a void region is defined by the one end portion into which the end portions of the thermocouple wires extend; junction-forming means mounted within said void region so as to form a stable mechanical and electrical junction between the extending end portions of said wires, said junction-forming means comprising at least a pair of small metallic wire-confining tubes and a metallic outer confining tube, one each of said small metallic tubes being mounted about and in intimate contact with one each of said extending end portions of the thermocouple wires, said outer confining tube being intimately mounted about said wire-confining tubes and disposed within said sheath to complete said junction and completely fill the void region.

4. A nonwelded thermocouple assembly adapted for use in high-temperature environments comprising:

a. an elongated electrically conductive sheath comprised of refractory metal and having opposed end portions;

b. a plurality of thermocouple wires each comprising a refractory metal composition including at least one metal selected from the group of refractory metals consisting of tungsten, rhenium and molybdenum with the composition of said wires being selected for use in high-temperature environments, said thermocouple wires being positioned within said sheath in predetermined space relation to said sheath and to each other, said refractory thermocouple wires extending therewithin along at least the major portion of the length of said sheath;

c. electrically conductive plug means comprised of a refractory metal and positioned adjacent one of said opposed ends of said sheath, said plug means being formed to define receiving aperture means for the end portions of each of said plurality of refractory metal thermocouple wires with said plug means being swaged into intimate engagement with said ends of each of said refractory metal thermocouple wires for effecting a mechanically bonded thermocouple junction therebetween;

d. electrical insulating means composed of a refractory material for use in high-temperature environments and surrounding said wires and occupying the remaining space within said sheath;

e. and an end closure cap of a refractory metal joined to and providing a protective enclosure for said one end portion of said sheath.

5. The thermocouple assembly of claim 4 in which said plug means includes a plurality of spaced individual receiving apertures for said plurality of wires and in which said thermocouple wires are straight and positioned in substantially parallel relation over the length of said sheath.

6. The thermocouple assembly of claim 5 in which said sheath is swaged into intimate engagement with said plug means to form a thermocouple junction of the grounded type.

7. The thermocouple assembly of claim 6 in which said plug means comprises a single unitary cylindrical plug.

8. The thermocouple assembly of claim 6 wherein said plug means comprises a plurality of similar unitary cylindrical plug members each having a receiving aperture for accommodating an end portion of an individual one of said thermoelectric wires and wherein said plug means further includes a sleeve member that is swaged about and into intimate surrounding relationship with said cylindrical plug members.

9. The thermocouple assembly of claim 4 wherein said plug means includes a singular receiving aperture for said plurality of thermocouple wires and wherein said plug means is maintained in predetermined spaced relation to said sheath and said end closure cap by said temperature-resistant insulating means to form a thermocouple junction of the ungrounded type.

10. In a nonwelded thermocouple assembly adapted for use in high-temperature environments, the combination comprising:

a. an elongated electrically conductive sheath comprised of a refractory metal and having opposed end portions;

b. a thermocouple wire comprised of a refractory metal composition including at least one metal selected from the group of refractory metals consisting of tungsten, rhenium and molybdenum with the composition of said wire being selected for use in said high-temperature environments, and wire being positioned within said sheath in predetermined spaced relation to said sheath, said refractory metal thermocouple wire extending therewithin along at least a major portion of the length of said sheath;

c. electrically conductive plug means comprised of refractory metal and positioned adjacent one of said opposite ends of said sheath;

d. said plug means having a longitudinal passageway for receiving said thermocouple wire and said plug means being swaged into engagement with said thermocouple wire to provide an intimate electrically conductive connection therebetween;

e. electrical insulating means, composed of a refractory material for use in high-temperature environments, occupying substantially all of the remaining space within said sheath;

f. and an end closure cap of a refractory metal joined to and forming a protective enclosure for said one end portion of said sheath.

11. The thermocouple assembly of claim 10 in which said sheath is swaged about said plug means to form a thermocouple of the grounded type.